United States Patent
Jones et al.

(10) Patent No.: US 6,994,334 B2
(45) Date of Patent: Feb. 7, 2006

(54) PREPARATION SURFACE WITH RESIDUE RECEPTACLE

(76) Inventors: Thomas M. Jones, 17532 Gothard St., Huntington Beach, CA (US) 92647; Ian Fettes, 2412 Holly La., Newport Beach, CA (US) 92663

( * ) Notice: Subject to any disclaimer, the term of this patent is extended or adjusted under 35 U.S.C. 154(b) by 107 days.

(21) Appl. No.: 10/648,156

(22) Filed: Aug. 26, 2003

(65) Prior Publication Data

US 2005/0046101 A1 Mar. 3, 2005

(51) Int. Cl.
*B23Q 3/00* (2006.01)

(52) U.S. Cl. .................. 269/289 R; 269/302.1
(58) Field of Classification Search ............ 206/565; 220/571, 572; 269/289 R, 302.1
See application file for complete search history.

(56) References Cited

U.S. PATENT DOCUMENTS

| | | | |
|---|---|---|---|
| 2,328,978 A | | 9/1943 | Hennessy |
| 2,639,659 A | | 5/1953 | Fry |
| 4,553,352 A | * | 11/1985 | Powell et al. .................. 47/71 |
| 4,798,372 A | * | 1/1989 | Tingle ........................ 269/54.5 |
| 5,249,699 A | * | 10/1993 | Williams .................... 220/571 |
| 5,366,208 A | | 11/1994 | Benjamin |
| 5,385,261 A | * | 1/1995 | Lippisch et al. ............ 220/572 |
| 5,514,443 A | * | 5/1996 | Chen ........................... 428/99 |
| 5,865,105 A | * | 2/1999 | Pepelanov .................. 99/446 |
| 6,047,845 A | * | 4/2000 | Rapaz ........................ 220/575 |
| 6,206,356 B1 | * | 3/2001 | Beloff .................... 269/289 R |

OTHER PUBLICATIONS

Web page—1998–2003 Cooking.com ; Bartelt Crumb Box by Bartelt.

* cited by examiner

*Primary Examiner*—Jacob K. Ackun, Jr.
(74) *Attorney, Agent, or Firm*—Larry K. Roberts; Peter Reitan

(57) ABSTRACT

A residue collector is adapted for coupling to a prep-board. The collection perimeter encompasses a reservoir and has support members for laterally and perpendicularly supporting the prep-board. The support members are inboard of the collection perimeter.

54 Claims, 6 Drawing Sheets

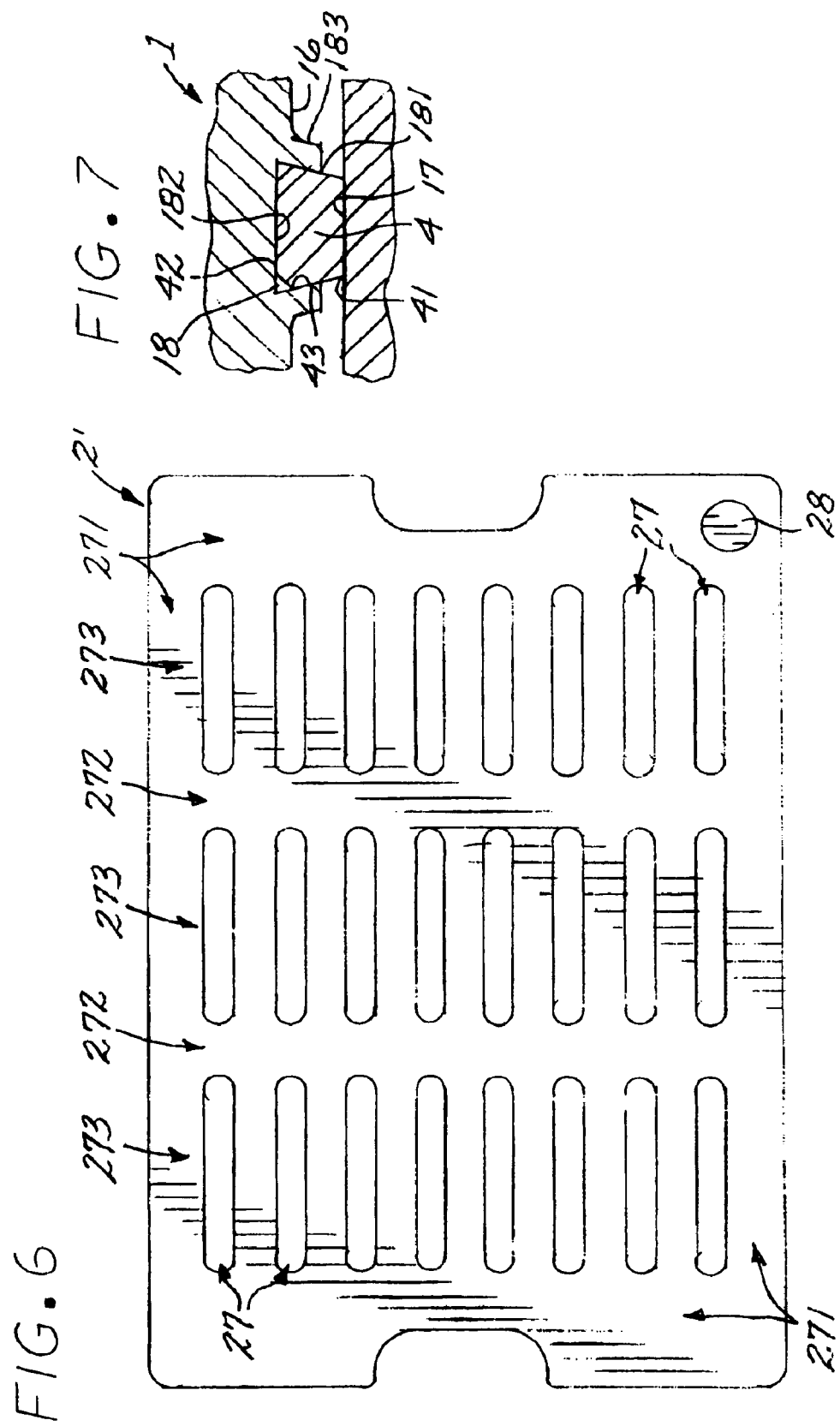

PREPARATION SURFACE WITH RESIDUE RECEPTACLE

BACKGROUND OF THE DISCLOSURE

The preparation of certain articles may be performed on a surface. The article being prepared and/or utensils or prep-tools used to prepare the article may damage, stain or cause wear and tear to the surface. It is known to use a portable surface to protect the underlying surface which may be more susceptible to damage, staining or wear and/or may be more expensive, permanent and difficult or costly to replace or repair. The preparation of some articles may also or alternatively create residue clean-up issues.

Preparing certain types of food with certain utensils, for example, may damage and/or stain an underlying surface. Damage may be caused by stains from, for example, oils, coloring or other food residue contacting the underlying surface. Damage may also be caused by utensils used in food preparation which may include, for example, knives, forks or other sharp or hard-edged utensils scraping against, cutting into or otherwise damaging an underlying surface. Damage may also be caused by the article being prepared, for example, by sharp edges of a bone in a piece of meat, shell, stone or other sharp article which is part of or entrained in the article or articles being prepared. Residue produced during the preparation of an article may alternatively, or additionally present a clean up or residue collection problem.

SUMMARY OF THE DISCLOSURE

An exemplary embodiment of a residue collector is adapted for coupling to a prep-board. The collection perimeter encompasses a reservoir and has support members for lateral and perpendicular support of the prep-board. The support members are inboard of the collection perimeter.

BRIEF DESCRIPTION OF THE DRAWINGS

These and other features and advantages of the invention will readily be appreciated by persons skilled in the art from the following detailed description of an exemplary embodiment thereof, as illustrated in the accompanying drawings, in which:

FIG. 6 illustrates an exemplary embodiment of a prep-board with throughways.

FIG. 7 illustrates a cross section of an exemplary embodiment of a residue collector with a support pad.

DETAILED DESCRIPTION OF THE DISCLOSURE

Figure 1:
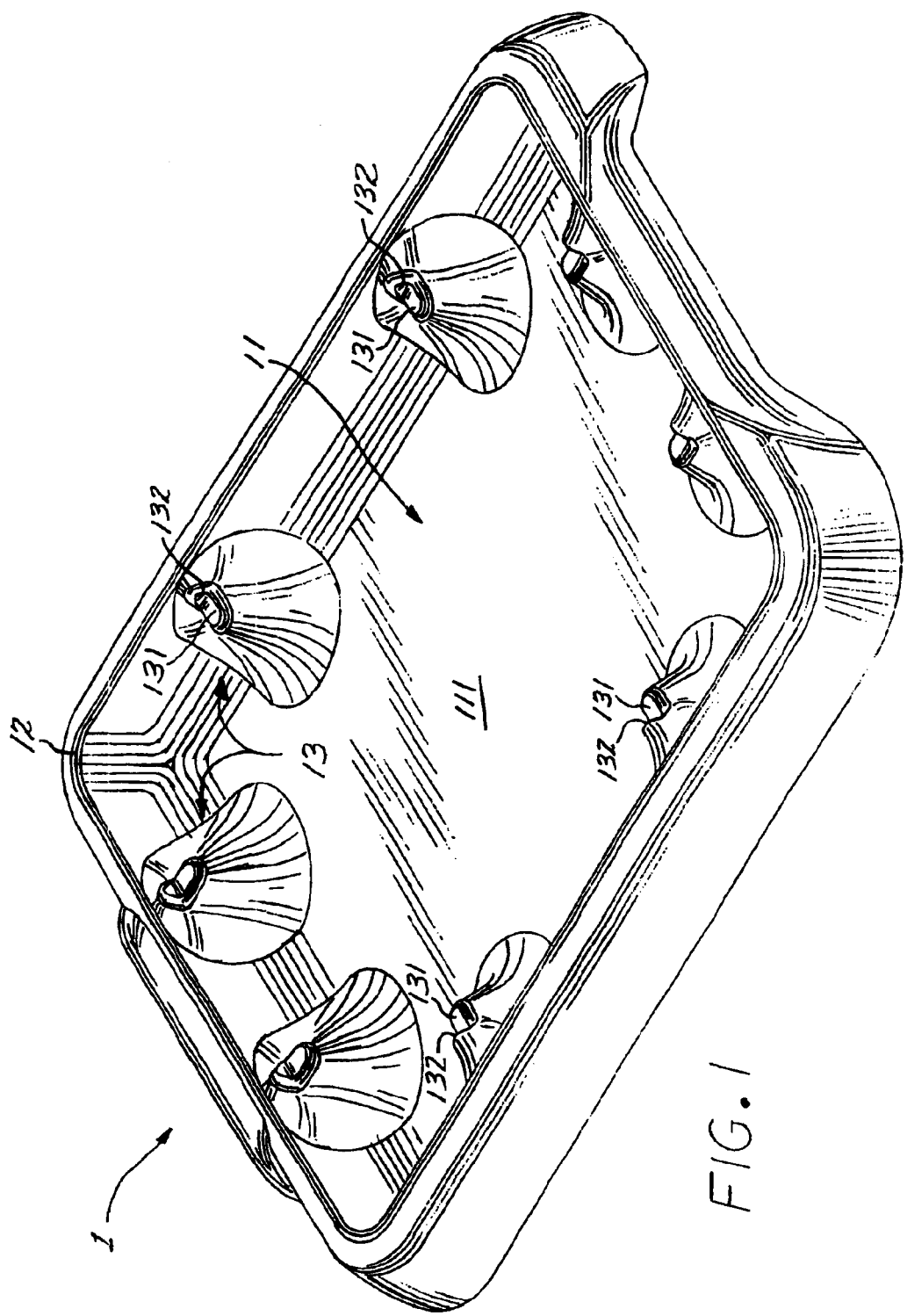
FIG. 1 is an isometric view of an exemplary embodiment of a residue collector adapted for coupling to a prep-board.

In the following detailed description and in the several figures of the drawing, like elements are identified with like reference numerals.

FIG. 1 illustrates an exemplary embodiment of a residue collector 1. The residue collector is adapted for coupling with a prep-board (not shown in FIG. 1). The residue collector 1 has a reservoir 11, a collection perimeter 12, and a plurality of support members 13. The support members 13 are adapted to support the board laterally, against forces acting in directions horizontal to the plane of the prep-board, to support the board perpendicularly, against the weight of the board and other forces acting perpendicular to the plane of the prep-board, and to secure the prep-board in a prep-position for preparing articles on the prep-surface of the prep-board. The support members 13 may lie inboard of the collection perimeter 12. The support members may be upward projections in the reservoir and may have a truncated generally conical shape.

In this exemplary embodiment, the collection perimeter 12 extends continuously around the area in which the prep-board will lie when coupled to the residue collector. The collection perimeter 12 is defined by those portions of the surface of the residue collector inboard of which residue placed on the surface of the residue collector will tend to fall into the reservoir and outboard of which residue placed on the surface of the residue collector would tend not to fall into the reservoir or to fall outside of or away from the reservoir. In FIG. 1, the surface of the residue collector 1, inboard of the collection perimeter 12, slopes downward into the reservoir. The surface of the reservoir collector 1, outboard of the collection perimeter, slopes downward away from the reservoir.

In an exemplary embodiment, the level or height of the residue collector surface along the collection perimeter may be constant as shown in FIG. 1. The level of the residue collector surface along the collection perimeter may, alternatively, vary from a collection perimeter maximum level to a collection perimeter minimum level. The reservoir 11 is defined by the spaces above the surface 111 of the residue collector 1, but below the collection perimeter minimum level, and within the collection perimeter 12. In FIG. 1, the collection perimeter maximum level is the same as the collection minimum level.

The support members 13 may be arranged to support a prep-board at a desired angle for preparation. A prep-board may, for example, be supported so that the upper surface or prep-surface of the prep-board is substantially horizontal when coupled with the residue collector in the prep-position and the residue collector is arranged on a horizontal supporting surface. When in the prep-position, perpendicular support portions 131 support the prep-board under the weight of the board and other forces acting perpendicularly to the plane of the board. When in the prep-position, lateral support portions 132 provide lateral support to restrict or constrain lateral movement of the board relative to the residue collector when acted upon by lateral forces. The lateral support portions 132 of the support members 13 may be arranged to abut a prep-board when the prep-board is coupled with the residue collector. The lateral support portions may laterally secure the prep-board in the prep-position. In the embodiment of FIG. 1, each support member 13 comprises both perpendicular and lateral support portions 131, 132. Alternatively, a support member may have only lateral support portions or only perpendicular support portions.

Figure 2:
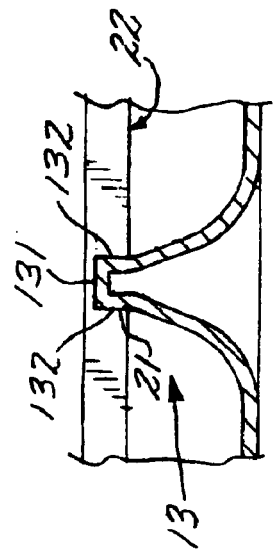
FIG. 2 illustrates an exemplary embodiment of a support member perpendicularly and laterally supporting a prep-board.
Figure 4:
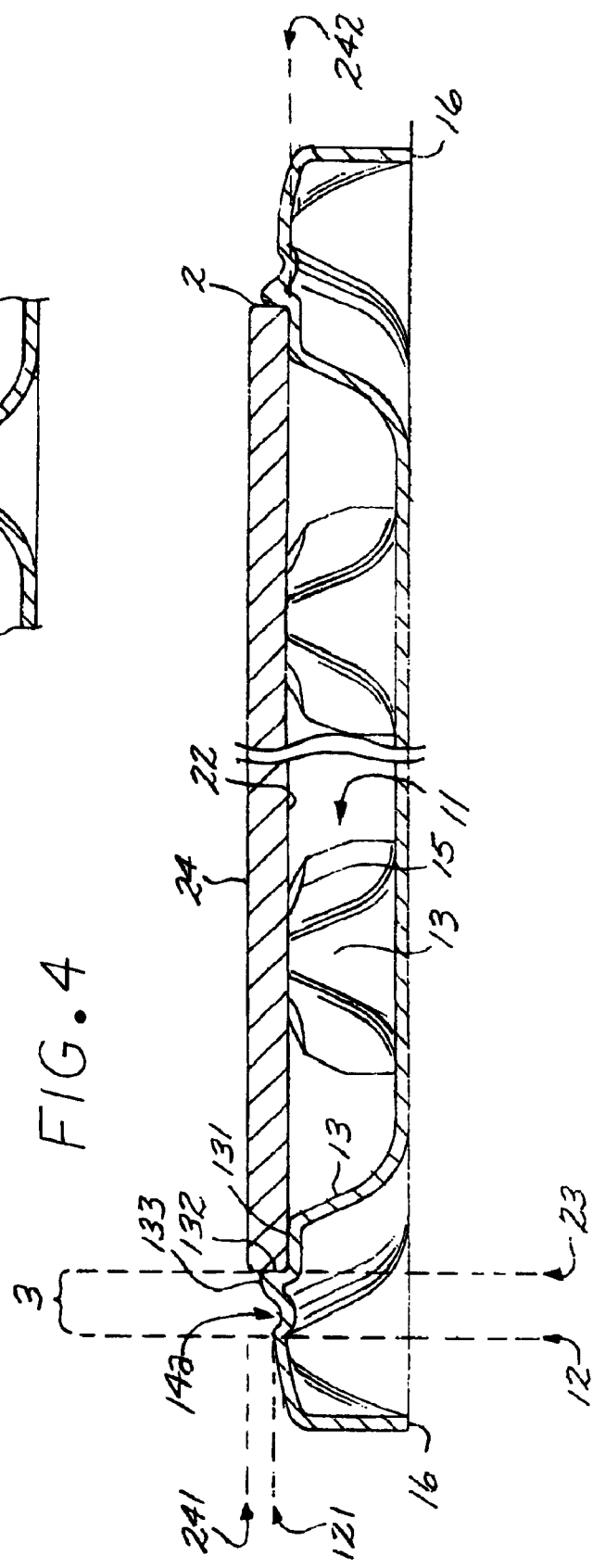
FIG. 4 is a cross-sectional view of the prep-board and residue collector illustrated in FIG. 3.
Figure 3A:
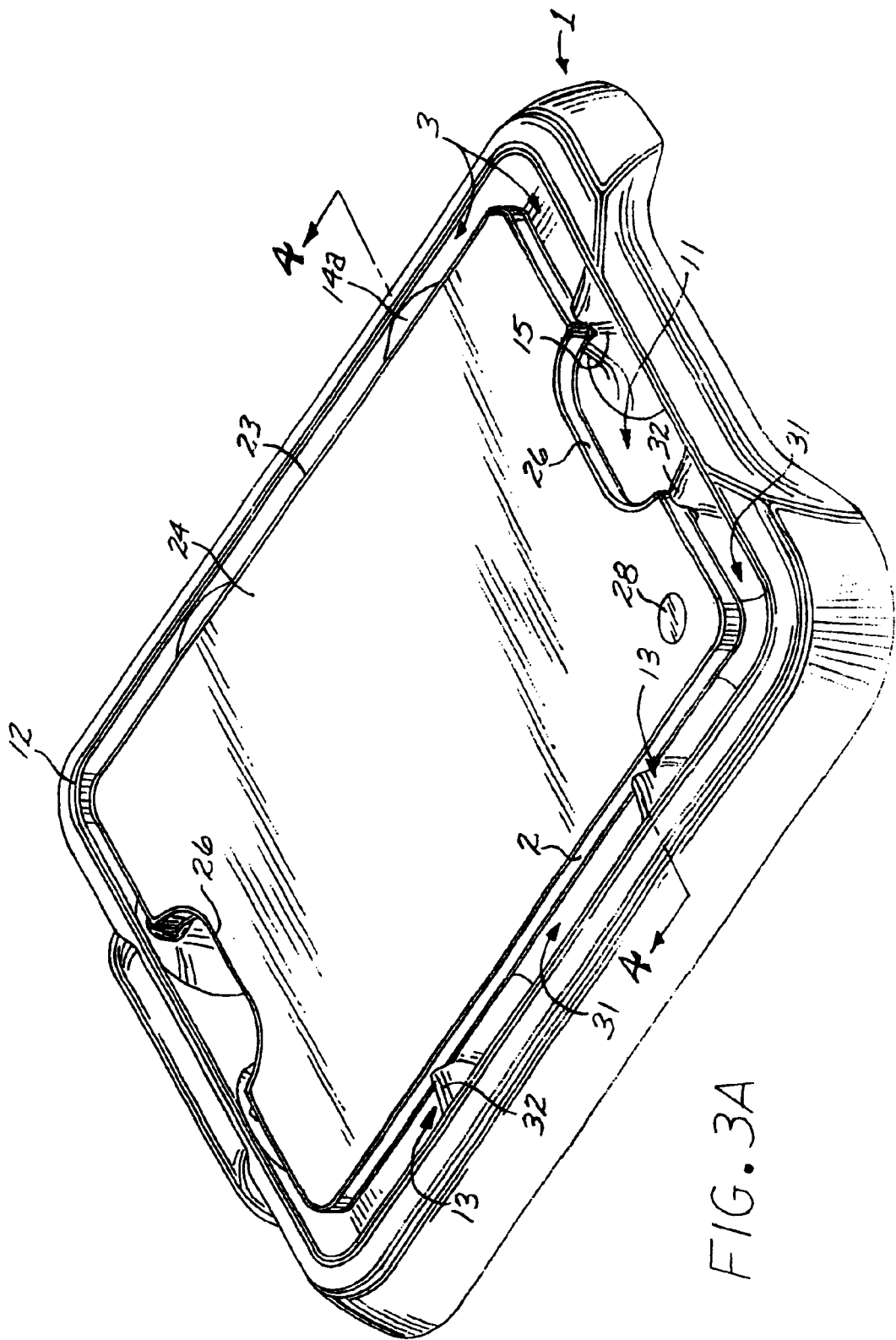
FIG. 3A is an isometric view of an exemplary embodiment of a prep-board coupled with a residue collector.
Figure 3B:
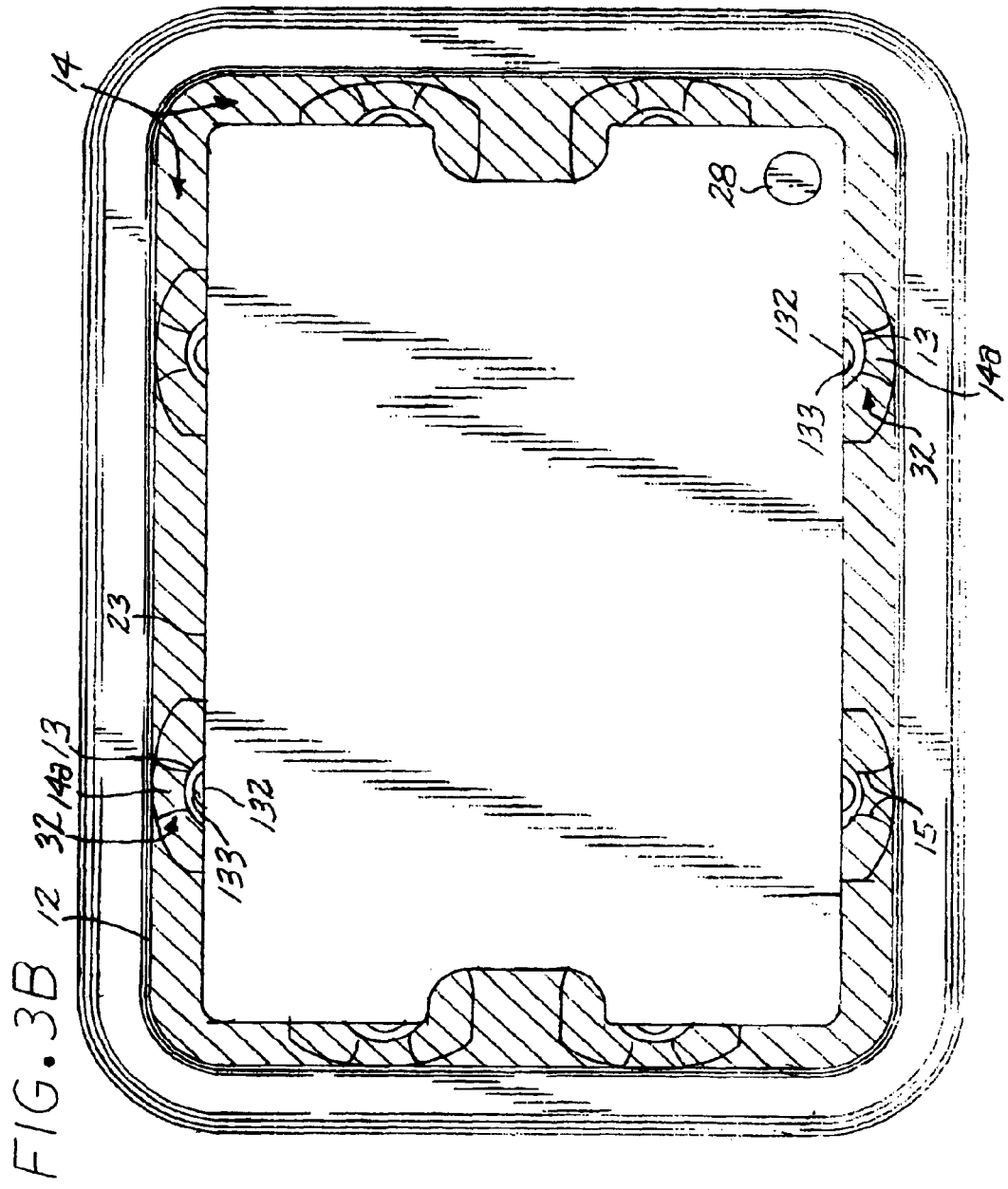
FIG. 3B is a plan view of an exemplary embodiment of a prep-board coupled with a residue collector.

The lateral support portions 132 of the prep-board may be located outboard of the position occupied by a prep-board in the prep-position (FIG. 3B). Perpendicular support portions may be located underneath the prep-board when in the prep-position (FIG. 4). Alternatively, support members may be arranged to abut a prep-board in recesses in the underside of the prep-board or against protrusions from the underside of the prep-board. The indentations or protrusions may be arranged and/or adapted to accept or meet the support member. In FIG. 2, for example, a perpendicular support portion 131 supports a prep-board perpendicularly and lateral support portions 132 support the prep-board laterally. The perpendicular and lateral support portions 131, 132 are arranged inside a support recess 21 on the under side 22 of the prep-board. The support portions could also be arranged to support convex features on the underside of a prep-board.

In FIGS. 1 and 2, the perpendicular support portions and lateral support portions are horizontal and vertical, respectively when the collector is resting on a horizontal surface. In other embodiments, perpendicular support and lateral support portions may comprise portions arranged at other angles. Such perpendicular support portions and lateral support portions may comprise, at least in part, the same surface area portions, where the portions is arranged at an angle that provides both lateral and vertical support.

In an exemplary embodiment illustrated in FIG. 3A, a prep-board 2 is coupled to a residue collector 1. The prep-board is in the prep-position and supported by perpendicular support portions 131 (FIG. 4) of support members 13 and secured laterally by lateral support portions 132 (FIG. 4) of the support members 13. The prep-board 2 has a perimeter 23. The prep-board perimeter 23 and the collection perimeter 12 define a gap 3. In the exemplary embodiment of FIG. 3A, the gap 3 is continuous around the entire prep-board perimeter 23. The gap 3 may comprise open portions 31 with open space through which residue may pass unobstructed from a location at or above the surface 24 of the prep-board down to the surface of the residue collector and into the reservoir 11. The gap 3 may comprise obstructed portions 32 where the surface of the residue collector meets the prep-board at support portions. In the obstructed portions 32, residue passing from the surface of the prep-board down through the gap and into the reservoir may be obstructed or partially obstructed by the surface of the residue collector.

FIG. 3B shows another view of the exemplary embodiment of FIG. 3A. The residue collector surface has gap-collector portions 14 that lie within the gap and which are at a level lower than the collection perimeter. The gap-collector portions 14 may define a continuous gap-collector surface portion 14 extending around the entire perimeter of the prep-board and within the gap. The profile of the residue collector surface in the gap 3 between the prep-board perimeter 23 and outwardly adjacent collection perimeter portions 12 includes gap-collector surface portions which are at a level or height lower than the outwardly adjacent portion of the collection perimeter 12, as illustrated in FIG. 4.

The gap-collector portion 14 includes obstructed gap-collector portions 14a in the obstructed portions 32 of the gap 3. The obstructed gap-collector surface portions 14a may extend at least about 1/16 of an inch below the outwardly adjacent collector perimeter portions. In the obstructed gap portion 32, the support member 13 adjacent the lateral support portion 132 may comprise a portion 133 which lies above the level of the outwardly adjacent portion of the collection perimeter 12. The lateral support portion may also extend above the level of the outwardly adjacent portion of the collection perimeter 12.

The gap-collector surface portions may help ensure that residue passing from at or above the prep-surface into the gap will tend to be diverted down into the reservoir and will not tend to fall over the collection perimeter where it could be diverted outside of or away from the reservoir. For example, in the exemplary embodiments of FIGS. 3A, 3B and 4, the surface of the residue collector from the gap-collector surface portions 14a into the bottom of the reservoir may define slopes 15 which guide residue falling from the prep-surface into the obstructed gap-collector portion 14a down into the reservoir 11.

Referring again to FIG. 4, in an exemplary embodiment, the level 241 of the surface 24 of the prep-board when the prep-board is in the prep-position is higher than the maximum level 121 of the collection perimeter 12. This may reduce the likelihood that the residue collector will interfere with prep-tools used to prepare items on the prep-board. The level 242 of the under side 22 of the prep-board 2 when the prep-board is in the prep-position may be lower than the minimum level of the collection perimeter 12. This may increase the likelihood that residue falling from the upper surface 24 of the prep-board will fall through the gap 3 into the reservoir 11.

In an exemplary embodiment, the gap may be at least about 1/4 of an inch wide around the entire perimeter. The gap may have a width falling at least within a range of about 3/8ths of an inch to about 3/4ths of an inch around the entire perimeter. The gap may also be at least about 1 inch or larger. The width of the gap in a particular collector/board assembly may be chosen to accommodate particular sorts of residue expected from the particular use for which the assembly is intended to be used.

The prep-board may have recesses 26 (FIG. 3A). The recesses 26 may provide extra space where hands may be placed when lifting the prep-board from the residue collector. The size of the gap adjacent the recesses 26 may be larger than in other areas of the gap. The increased gap size may accommodate larger pieces of residue which may not fit through other open portions of the gap. For example, the gap may have a width of at least about one inch or at least about one and a half inches or more adjacent the recesses. The residue may spill over the edges, in the case of fluid residue of sufficient quantities, or may be pushed by a user over the edge, through the gap and into the reservoir. In the case of a food preparation prep-board, a user could, for example, push the residue into the reservoir with the edge of a knife, spatula or other utensil.

The prep-board may comprise plastics or thermoplastics, including but not limited to polyethylene, polypropylene, acrylic or polycarbonate, metals, including but not limited to stainless steel, glass, fiberglass, wood, composites or any other suitable material. Suitable material for any particular application may depend on the articles to be prepared on the prep-board, the utensils or tools with which the preparation is expected to be performed and the particular forms of preparation to be performed on the board. For certain applications, the materials may be selected from among those materials approved for the application by the FDA or other governmental agency.

Figure 5:
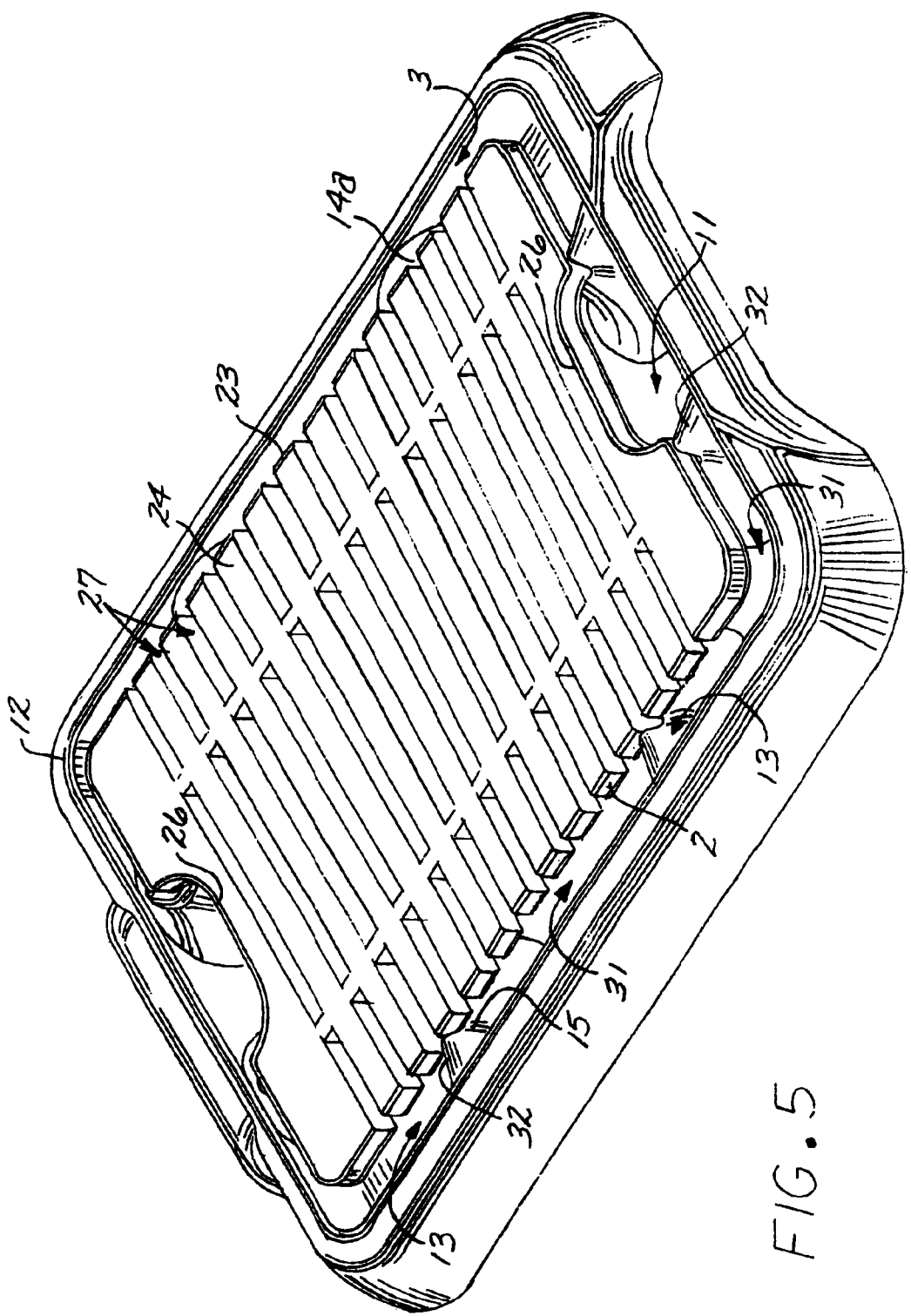
FIG. 5 illustrates an exemplary embodiment of a prep-board coupled with a residue collector.

In certain applications, a prep-board with a solid surface may not be necessary and/or additional space through which residue may pass into the reservoir may be desirable. FIG. 5 illustrates an exemplary embodiment of a residue collector adapted to be coupled with a prep-board 2'. The residue collector 1 has a reservoir 11, a collection perimeter 12 and a plurality of support portions 13. The support portions are adapted to support the prep-board 2' with a prep-board perimeter. The prep-board has a plurality of throughways 27. The throughways 27 may be, for example, slots 27. The size and spacing of the slots and the surface area between the slots may be selected to provide adequate support for the article to be prepared and to provide adequate space for the residue produced from the preparation to pass through. In an exemplary embodiment, a prep-board may have slots with a width in a range of at least about ¼ of an inch to about ⅜ of an inch. The slots may be laterally separated from one another by at least about ½ of an inch. The board 2' may be fabricated of the same materials as the board 2.

In an alternate exemplary embodiment shown in FIG. 6, a prep-board 2' with throughways 27 may have an unbroken, solid perimeter portion 271 extending around the perimeter of the prep-board. The solid perimeter portion 271 may provide structural strength and stability. The throughways may comprise slots 27. The prep-board may be formed by machining or routing the throughways in a prep-board with a solid surface. The slots 27 may be arranged parallel to the length of a prep-board. The slots may be arranged in a plurality of rows of slots 272, each row of slots 272 being separated from adjacent rows of slots 272 by a solid, unbroken slot-row separation portion 273. The separation portions may provide additional structural support for the board. In the exemplary embodiment of FIG. 6, the slots 27 are arranged in three rows of slots 272. In alternate embodiments, the throughways could be arranged in fewer or more rows. The rows and/or the slots may be arranged in different orientations with respect to the board. In the case of a board being used as a cutting board, the slot-row separation portion may provide a solid, unbroken surface where cutting could be performed without having the cutting instrument cut across a throughway.

A residue collector may be adapted to receive any of several alternate prep-boards. For example, a given residue collector may be adapted to receive various boards. The same residue collector could be used with any one of the prep-boards. The prep-boards could be adapted for use with different residue collectors. For example, the residue collector could be adapted for use with a prep-board with a solid surface and a prep-board with throughways, each board being shaped for coupling with the residue collector. A residue collector could also be adapted for use with various prep-boards with different surfaces or comprising different materials, or having through-ways of various designs or sizes, or prep-boards with different decorative details, or with different colors or different color coding. Each of the boards could be adapted for use with the same residue collector.

In an exemplary embodiment, various prep-boards for use with a residue collector could be color-coded with different colors designating different boards for use with preparing different types of articles. Using different boards to prepare different types of articles could, for example, prevent cross-contamination of residue, where residue from one article or class of articles is incompatible with another article or class of articles. In the food industry, for example, color codes could designate particular boards for use with different types of food, for example meat, poultry and fish, or any other category of food for which a separate designation might be desirable. In an exemplary embodiment, a color code could be provided for a prep-board by inserting a piece of material 28 (FIGS. 3A/3B) with a specified color into a recess on a surface of the prep-board. A color-coding key could be provided to define the designated use for each of the separately color-coded boards. The key could be posted in an area in which the prep-boards are used as a reminder to prep-board users, so that particular board will be use only with the designated types of articles, thereby inhibiting undesirable cross-contamination.

The residue collector may be formed in a unitary, one-piece body. It may be formed, for example by injection molding, casting, machining, deep draw stamping or vacuum forming. Exemplary materials from which the residue collector can be fabricated include, plastics or thermoplastics, including but not limited to polyethylene, polypropylene, acrylic or polycarbonate, metals, including but not limited to aluminum, stainless steel or pewter, glass, fiberglass, wood, composites or any other suitable material. For certain applications, the materials may be selected from among those materials approved for the application by the FDA or other governmental agency.

The residue collector has a base 16 which may contact an underlying surface when the collector is placed on the surface in a position suitable for placing a prep-board on the collector in the prep-position. The outer-most portions of the base may extend beyond the collection perimeter. This may provide additional stability when the prep-board and the residue collector are subject to lateral forces experienced during use.

In an exemplary embodiment, the base may not contact an underlying surface due to support pads which may be arranged on the bottom of the residue collector. The support pads may be attached to the bottom of the residue collector by adhesives or other means of attaching the support pad, and may be inserted into a recess in the bottom of the board. When the prep-board is subjected to perpendicular and lateral forces during use, the residue collector and/or the support pads may compress or deform under those forces, such that the base does contact the surface, which may provide additional stability.

FIG. 7 shows an exemplary embodiment of a support pad 4 attached to the bottom 16 of a residue collector 1. The residue collector 1 is arranged on an underlying surface 17. The support pad 16 is arranged in a recess 18 in the bottom 16 of the residue collector 1. The recess may be tapered so that the entrance 181 to the recess has a narrower diameter than the interior diameter further inside the recess, for example at the top 182 of the recess 18. The entrance 181 to the recess 18 may be in a lip 183 projecting downward from the bottom 16 of the residue collector 1. The interior diameter of the entrance to the recess may be smaller than the diameter of the support pad 4 within the recess. The support pad 4 may be tapered so that the diameter of the support pad within the recess 18 is larger than the diameter at the entrance and narrower at the bottom 41 outside the recess. The support pad may be tapered so that the top 42 of the support pad has a diameter narrower than the entrance to the recess. The support pad may be inserted into the recess by first inserting the top of the support pad into the entrance of the recess and pressing the pad in toward the recess. After the widest part of the support pad 43 passes through the entrance, the support pad expands and the shape of the support pad and recess act to hold the pad in place. The support pad may comprise rubber or other elastomer. The support pad may additionally or alternatively be attached to the bottom of the residue collector with adhesive.

In an exemplary embodiment, the residue collector may have a generally rectangular shape. The residue collector may be adapted to be coupled with a generally rectangular prep-board. The prep-board may be about 8, 11.5 or 15 inches wide and about 12, 15.5 or 19 inches long, respectively. The base of the residue collector may correspondingly be about 11, 14.5 or 18 inches wide and about 15, 18.5 or 22 inches long, respectively. The prep-board may be at least about ⅜ of an inch thick. In the alternative, prep-boards and residue collectors may have shapes other than generally rectangular shapes, for example generally circular, oval, triangular, or other shapes. The surface contours of the residue collector, including the contours of the support members, lateral and perpendicular support portions, gap collector and obstructed gap collector portions may be smooth, avoiding narrow corners and sharp angles. The smooth surface contours may facilitate clean-up.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A residue collector adapted for coupling to a prep-board, comprising:
   a reservoir;
   a collection perimeter defined by a residue collector surface, the collection perimeter encompassing the reservoir, wherein the residue collector surface along the collection perimeter has a minimum height;
   a plurality of support members for laterally and perpendicularly supporting a prep-board in a prep-position for preparing articles on a prep-surface of the prep-board, the support members being inboard of the collection perimeter, wherein the support members each comprise a lateral support portion, the lateral support portion facing an inboard direction and arranged to meet a perpendicular edge of a prep-board, and comprise a perpendicular support portion, the perpendicular support portion being adjacent to the lateral support portion and arranged to support a horizontal surface of the prep-board, wherein the perpendicular support portion lies below the minimum height of the residue collector surface along the collection perimeter.

2. The residue collector of claim 1, wherein the residue collector is a unitary, one-piece structure.

3. The residue collector of claim 1, wherein a base portion of the residue collector lies outboard of the collection perimeter.

4. The residue collector of claim 1, wherein the residue collector has a generally rectangular shape.

5. The residue collector of claim 4, wherein the base of the residue collector has dimensions of one of about 11 by 15 inches, 14.5 by 18.5 inches or 18 by 22 inches.

6. The residue collector of claim 1, wherein the residue collector surface along the collection perimeter has a maximum height and the lateral support portion extends above said maximum height.

7. The residue collector of claim 1, wherein at least one of the plurality of support members has a truncated, generally conical shape.

8. The residue collector of claim 1, wherein at least one of the plurality of support members lies at least partially in the reservoir.

9. The residue collector of claim 8, wherein the at least one of the plurality of support members is an upward projection in the reservoir.

10. The residue collector according to claim 1, wherein the residue collector comprises polycarbonate.

11. A prep-board assembly, comprising:
    prep-board with a prep-board perimeter;
    a residue collector comprising a reservoir, a collection perimeter encompassing the reservoir and a plurality of support members laterally and perpendicularly supporting the prep-board when the prep-board is removably placed in a prep-position;
    wherein the prep-board perimeter and the collection perimeter define a continuous gap around the prep-board perimeter; and wherein the support members each comprise a lateral support portion, the lateral support portion facing an inboard direction and arranged to meet a perpendicular edge of a prep-board, and comprise a perpendicular support portion, the perpendicular support portion being adjacent to the lateral support portion and arranged to support a horizontal surface of the prep-board.

12. The prep-board assembly of claim 11, where in the gap is at least about 3/8 of an inch around the entire prep-board perimeter.

13. The prep-board assembly of claim 11, wherein a top surface of the prep-board lies above a maximum level of the collection perimeter when in the prep-position.

14. The prep-board assembly of claim 13, wherein the top surface of the prep-board lies at least about 1/8 of an inch above the maximum level of the collection perimeter when in the prep-position.

15. The prep-board assembly of claim 11, wherein the underside of the prep-board lies below a minimum level of the collection perimeter when in the prep-position.

16. The prep-board assembly of claim 15, wherein the underside of the prep-board lies at least about 1/8 of an inch below the minimum level of the collection perimeter when in the prep-position.

17. The prep-board assembly of claim 11, wherein the residue collector comprises a continuous gap-collector portion within the gap and encompassing the prep-board perimeter and lower than adjacent collector perimeter portions.

18. The prep-board assembly of claim 17, wherein the continuous gap-collector portion includes at least one obstructed gap portion adjacent at least one of the plurality of support portions, wherein in the obstructed gap portion, the gap-collector surface portion extends at least about 1/16 of an inch below an outwardly adjacent collector perimeter portions.

19. The prep-board assembly of claim 11, wherein the prep-board has a solid surface.

20. The prep-board assembly of claim 11, wherein the prep-board has throughways formed through the prep-board.

21. The prep-board assembly of claim 20, wherein the throughways comprise slots formed through the prep-board.

22. The prep-board assembly of claim 20, wherein the prep-board comprises a solid perimeter portion extending around the perimeter of the prep-board.

23. The prep-board assembly of claim 21, wherein the prep-board comprises a plurality of rows of slots, adjacent rows of slots being separated from one another by a separation portion.

24. The prep-board assembly of claim 11, wherein the prep-board has a generally rectangular shape.

25. The prep-board assembly of claim 24, wherein the prep-board has dimensions of one of about 8 by 12 inches, about 11.5 by 15.5 inches or 15 by 19 inches.

26. The prep-board assembly of claim 11, wherein the lateral support portions are at about a right angle to the corresponding perpendicular support portions.

27. The prep-board assembly of claim 26, wherein the collection perimeter has a maximum level in relation to a bottom surface of the reservoir, and the lateral support portion extends above the maximum level of the collection perimeter.

28. The prep-board assembly of claim 11, wherein at least one of the plurality of support members has a truncated, generally conical shape.

29. The prep-board assembly of claim 11, wherein in at least one of the plurality of support members lies at least partially in the reservoir.

30. The prep-board assembly of claim 29, wherein the at least one of the plurality of support members is an upward projection in the reservoir.

31. A residue collector system, comprising:
a residue collector comprising a collection perimeter encompassing a reservoir and a plurality of support members adapted to laterally and perpendicularly support a prep-board;
a plurality of prep-boards of different types adapted to be removably supported in a prep-position by the residue collector;
wherein a first prep-board has a prep-board perimeter, the prep-board perimeter and the collection perimeter defining a continuous gap around the prep-board perimeter.

32. The residue collector system of claim 31, wherein the plurality of prep-boards adapted to be supported in a prep-position by the residue collector comprise a first prep-board, having a first unique visible code which distinguishes it from the other of the plurality of prep-boards, and a second prep-board, having a second unique visible code which distinguishes it from the other of the plurality of prep-boards.

33. The residue collector system of claim 32, wherein the first unique visible code has a first color and the second unique visible code has a second color that is different from the first color.

34. The system according to claim 31, wherein the plurality of prep-boards comprises a prep-board with a solid surface.

35. The system according to claim 31, wherein the plurality of prep-boards comprises a prep-board with throughways formed through the prep-board from a prep-surface to a bottom surface.

36. The system according to claim 31, wherein the plurality of prep-boards comprises a first prep-board with a solid surface and a second prep-board with throughways formed through the second prep-board from a prep-surface to a bottom surface.

37. A prep-board assembly, comprising:
a prep-board with a prep-board perimeter;
a residue collector comprising a reservoir, a collection perimeter encompassing the reservoir and a plurality of support members inboard of the collection perimeter, the collection perimeter having a maximum level and a minimum level, the plurality of support members having lateral support portions and perpendicular support portions laterally and perpendicularly supporting the prep-board in a prep-position with a top surface of the prep-board lying above the maximum level and an underside of the prep-board lying below said minimum level;
wherein the prep-board perimeter and the collection perimeter define a continuous gap around the prep-board perimeter and the residue collector comprises a continuous gap-collector portion within the gap and encompassing the prep-board perimeter and lower than adjacent collector perimeter portions; and
wherein at least one of the plurality of support members is an upward projection lying in the reservoir.

38. The prep-board assembly of claim 37, wherein the prep-board has a generally rectangular shape.

39. A prep-board assembly, comprising:
a prep-board with a prep-board perimeter, the prep-board having a surface; and
a residue collector adapted for removably coupling with a prep-board, the residue collector comprising a reservoir, a collection perimeter encompassing said reservoir, the collection perimeter having a maximum level;
wherein when the prep-board is coupled with the residue collector, the prep-board perimeter and the collection perimeter define a continuous gap around the prep-board perimeter and the surface of the prep-board is positioned above the maximum level of the collection perimeter when in the prep-position.

40. The prep-board assembly of claim 39, wherein the gap is at least about ⅜ of an inch around the entire prep-board perimeter.

41. A prep-board system, comprising:
a generally rectangular reservoir portion comprising a first pair of opposing sides and a second pair of opposing sides;
at least one first support member along a first side of the first pair of opposing sides and at least one second support member along a second side of the first pair of opposing sides;
at least one third support member along a first side of the second pair of opposing sides and at least one fourth support member along a second side of the second pair of opposing sides;
at least one third support member along a first side of the second pair of opposing sides and at least one fourth support member along a second side of the second pair of opposing sides;
a generally rectangular prep-board, wherein the first, second, third and fourth support members are arranged to support the prep-board in a generally horizontal prep-position;
wherein the first, second, third and fourth support members each comprises a lateral support portion, arranged to abut a perpendicular outer edge of the prep-board when the prep-board is removably positioned in the prep-position, and each comprises a perpendicular support portion, arranged to support a horizontal bottom surface of the prep-board when the prep-board is in the prep-position.

42. The prep-board system of claim 41, further comprising a plurality of support pads arranged on an underside of the reservoir portion.

43. The prep-board system of claim 42, wherein the plurality of support pads comprise an elastomer.

44. The prep-board system of claim 42, wherein the plurality of support pads are inserted into corresponding recesses located on the underside of the reservoir portion.

45. The prep-board system of claim 41, further comprising a plurality of prep-boards, each adapted to be supported by the plurality of support members, wherein each of the plurality of prep-boards has a unique visible code which distinguishes it from the other of the plurality of prep-boards.

46. The prep-board system of claim 45, wherein the unique visible code comprises a unique color code.

47. The prep-board system of claim 41, wherein the at least one first support member comprises two first support members, the at least one second support member comprises two second support members, the at least one third support member comprises two third support members and the at least one fourth support member comprises two fourth support members.

48. The prep-board system of claim 41, wherein the prep-board has first and second hand-hold recesses in opposing first and second sides of the prep-board.

49. The prep-board system of claim 41, wherein the reservoir portion comprises polycarbonate.

50. A residue collector adapted for coupling to a prep-board, comprising:
   a collector surface having a collection perimeter encompassing a reservoir having a bottom surface, wherein the collector surface slopes downward into the reservoir inboard of the collection perimeter and slopes downward away from the reservoir outboard of the collection perimeter, and wherein the collection perimeter has a maximum level and a minimum level relative to said bottom surface;
   a plurality of support members, wherein each of the plurality of support members has a lateral support portion adapted for providing lateral support to a prep-board in a prep-position and having a perpendicular support portion adapted to provide perpendicular support to a prep-board in a prep-position;
   wherein each of the plurality of the support members lies inboard of the collection perimeter.

51. The residue collector according to claim 50, wherein each of the lateral support portions extend above the maximum level.

52. The residue collector according to claim 50, wherein each of the perpendicular support portions lies below the minimum level.

53. The residue collector according to claim 50, wherein each of the lateral support portions extends above the maximum level and each of the perpendicular support portions lies below the minimum level.

54. The prep-board assembly of claim 37, wherein the collection perimeter has a constant level and the maximum level and the minimum level are the same level.

* * * * *